US006984077B2

(12) United States Patent
Bush et al.

(10) Patent No.: US 6,984,077 B2
(45) Date of Patent: Jan. 10, 2006

(54) SYSTEM FOR JOINING POLARIZATION-MAINTAINING OPTICAL FIBER WAVEGUIDES

(75) Inventors: Simon P. Bush, Ambler, PA (US); Nellie L. Cabato, Plymouth Meeting, PA (US); Alan D. Gomes, Fall River, MA (US); S. Dyer Harris, Wilmington, DE (US); Douglas F. Tipton, Wilmington, DE (US); Laurence N. Wesson, Blue Bell, PA (US); Holam Chau, Lafayette Hill, PA (US)

(73) Assignee: Aurora Instruments, Inc., Ambler, PA (US)

( * ) Notice: Subject to any disclaimer, the term of this patent is extended or adjusted under 35 U.S.C. 154(b) by 60 days.

(21) Appl. No.: 10/806,534

(22) Filed: Mar. 23, 2004

(65) Prior Publication Data

US 2004/0258370 A1   Dec. 23, 2004

Related U.S. Application Data

(60) Provisional application No. 60/456,968, filed on Mar. 25, 2003.

(51) Int. Cl.
*G02B 6/38* (2006.01)
(52) U.S. Cl. .............................. 385/97; 385/96; 385/98
(58) Field of Classification Search ............ 385/95–99, 385/147
See application file for complete search history.

(56) References Cited

U.S. PATENT DOCUMENTS

| | | | |
|---|---|---|---|
| 4,274,707 A | 6/1981 | Pacey et al. ............... | 350/96.2 |
| 4,548,630 A | 10/1985 | Biedka ............................ | 65/2 |
| 4,696,535 A | 9/1987 | Saha ........................ | 350/96.15 |
| 4,735,481 A | 4/1988 | Lukas et al. ............... | 350/96.2 |
| 4,765,704 A | 8/1988 | Pers ......................... | 350/96.15 |
| 4,790,617 A | 12/1988 | Campbell et al. ......... | 350/96.15 |
| 4,824,199 A | 4/1989 | Uken ........................ | 350/96.15 |
| 4,832,438 A | 5/1989 | Engel et al. ............... | 350/96.2 |
| 4,911,524 A | 3/1990 | Itoh et al. ................. | 350/96.21 |
| 4,950,046 A | 8/1990 | Hughes et al. ........... | 350/96.18 |
| 4,978,201 A | 12/1990 | Yamada et al. ............. | 350/320 |
| 5,002,357 A | 3/1991 | Newell ....................... | 350/96.2 |
| 5,011,259 A | 4/1991 | Lieber et al. ............. | 350/96.21 |
| 5,195,157 A | 3/1993 | Penfold ........................ | 385/96 |
| 5,249,246 A | 9/1993 | Szanto ........................ | 385/96 |
| 5,249,247 A | 9/1993 | Whitesmith .................. | 385/96 |
| 5,257,337 A | 10/1993 | Grigsby et al. ............... | 385/99 |

(Continued)

*Primary Examiner*—Phan T. H. Palmer
(74) *Attorney, Agent, or Firm*—Ernest D. Buff & Associates, LLC; Ernest D. Buff; Gordon E. Fish

(57) ABSTRACT

A splicing system for joining polarization-maintaining, single mode optical fibers produces durable fusion splices that have low transmission loss and maintain mode integrity. The system employs active optical techniques such as profile alignment or local injection and detection to achieve optimized lateral alignment of the fibers prior to fusion. Azimuthal alignment is performed using a transverse, polarized light illumination and detection system. Each fiber is rotated azimuthally to determine a transverse intensity function. The transverse intensity functions of the respective fibers are cross-correlated to determine a relative orientation that matches the polarization axes of the fibers. After the relative position of the fibers is manipulated laterally, axially, and azimuthally, the fibers are fusion spliced using an electric arc discharge. The accurate alignment achievable using the transverse illumination mechanism to drive adaptive fiber positioning affords a method for reliably producing low loss, mode-matched splices. Simplicity of design and operation make the system rugged and enable accurate alignment and low loss fusion of fibers under adverse working conditions.

11 Claims, 9 Drawing Sheets

U.S. PATENT DOCUMENTS

| | | | |
|---|---|---|---|
| 5,340,371 A | 8/1994 | Dyott | 65/501 |
| 5,417,733 A | 5/1995 | Wesson | 65/378 |
| 5,481,640 A | 1/1996 | Harman et al. | 385/147 |
| 5,533,160 A | 7/1996 | Watanabe et al. | 385/96 |
| 5,561,728 A | 10/1996 | Kobayashi et al. | 385/97 |
| 5,570,446 A | 10/1996 | Zheng et al. | 385/98 |
| 5,677,973 A | 10/1997 | Yuhara et al. | 385/90 |
| 5,758,000 A | 5/1998 | Zheng | 385/97 |
| 5,815,611 A | 9/1998 | Dhadwal | 385/12 |
| 6,034,718 A | 3/2000 | Hattori | 348/61 |
| 6,088,503 A | 7/2000 | Chandler et al. | 385/135 |
| 6,190,057 B1 | 2/2001 | Osaka et al. | 385/96 |
| 6,203,214 B1 * | 3/2001 | Wesson | 385/97 |
| 6,206,583 B1 | 3/2001 | Hishikawa et al. | 385/96 |
| 6,246,819 B1 | 6/2001 | Windebank | 385/48 |
| 6,287,020 B1 | 9/2001 | Osaka et al. | 385/96 |
| 6,294,760 B1 | 9/2001 | Inoue et al. | 219/383 |
| 6,324,319 B1 | 11/2001 | Tselikov et al. | 385/28 |
| 6,341,242 B1 | 1/2002 | Mahmood et al. | 700/117 |

* cited by examiner

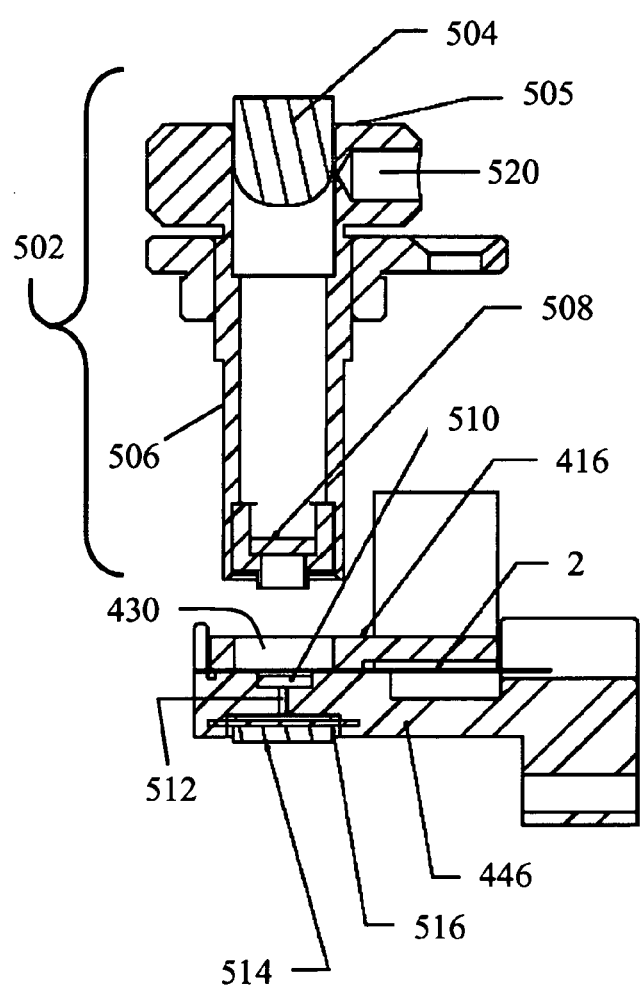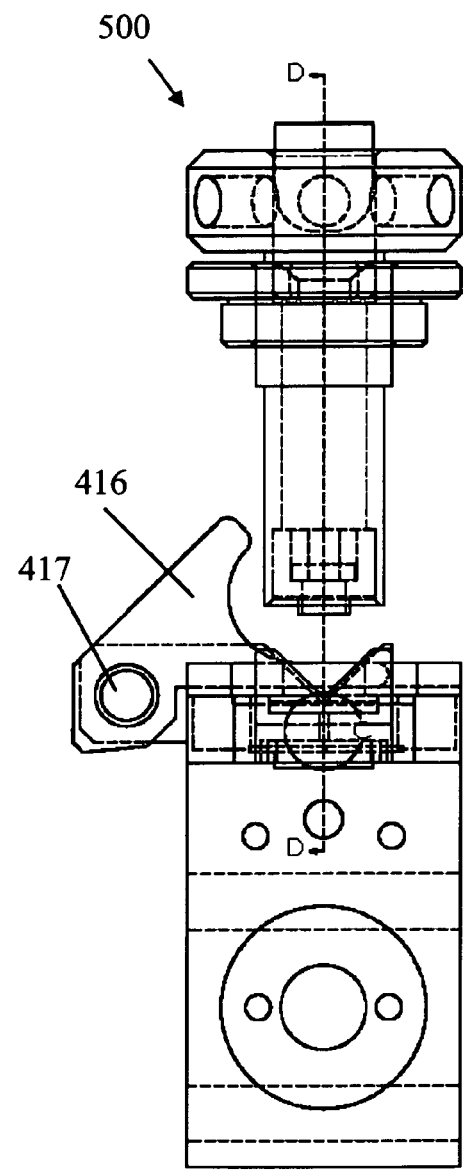
Fig. 7b
Fig. 7a

SYSTEM FOR JOINING POLARIZATION-MAINTAINING OPTICAL FIBER WAVEGUIDES

This Application claims the benefit of Application No. 60/456,968, filed Mar. 25, 2003.

BACKGROUND OF THE INVENTION

1. Field of the Invention

This invention relates to an apparatus for joining optical fiber waveguides; and more particularly, to a system for adaptively positioning and orienting polarization-maintaining fibers for fusion splicing, so that the transmission loss of the joined fiber is minimized and the mode integrity is maintained.

2. Description of the Prior Art

Transmission of data by optical fiber waveguides, also called fiber optics or optical fibers, has become ubiquitous in the telecommunications and computer industries. Digital information in an electronic system is converted into a series of pulses of light generated by lasers or light emitting diodes (LED's), which are injected into long fibers of glass or polymeric materials. The fibers are capable of propagating the light with extremely low losses and acceptably low dispersion, whereby information embodied in the modulation pattern may be conveyed. The light that emerges from the other end of the fiber can be detected and reconverted into electronic signals that faithfully reproduce the original signal.

Fiber optic communication has a number of advantages over traditional transmission means such as hard-wired coaxial and twisted pair cable and lower frequency electromagnetic broadcasting such as radio and microwave. Foremost is the much larger bandwidth available. In addition, existing infrastructure such as cable ducts, utility poles, and the like presently used by telecommunications companies can be upgraded with relatively little disruption and moderate cost by substituting optical fiber cable for existing copper wire. Thus, dramatic increases in bandwidth needed to accommodate the needs of an information-based, Internet-driven society and commerce can be obtained with comparatively little disruption.

The bandwidth of a given optical communications system is further increased by use of polarization-maintaining (PM), single mode optical fiber. Such a PM fiber is characterized by some form of azimuthal asymmetry that results in very different propagation constants modes of two orthogonal polarizations. Cross coupling of the modes is very low, typically at a level of −20 to −30 dB.

Implementation of fiber optic systems requires both the equipment for actual transmission and processing of the data, and the equipment needed to install and maintain the fiber optic system and its infrastructure. The transmission and processing equipment, such as the fiber itself and the corresponding components needed to generate, detect, and process optically-borne information, have been developed to an ever increasing level of sophistication. While certain systems for joining and splicing fiber optic cables have been developed, there remains a need in the art for improved equipment and methods for splicing that are reliable, economical, and which result in minimal loss of signal integrity and strength, especially for polarization-maintaining fibers. Such systems, equipment, and methods are essential if the full inherent advantages of optical transmission are to be more widely implemented.

Together, these considerations call for splicing systems that are compact, portable, and able to be operated rapidly and reliably under adverse working conditions and with minimal slack cable. Moreover, it is desired that such a splicing system be capable of joining two fibers in a way that (i) causes minimal disruption or discontinuity in the optical transmission, (ii) does not adversely increase the diameter and volume of the cable, and (iii) has a durability as close as possible to that of an original fiber. Systems are also desired that are simple and reliable enough to be used by technicians who lack extensive training. There remains an urgent need for optical splicing equipment satisfying these requirements.

Optical fiber waveguides in common use share a number of structural features. The waveguide almost invariably comprises a thin, elongated fiber core responsible for conducting the light and at least one additional layer. Most often the fiber core is highly pure glass surrounded by a first and intimately bonded layer termed a cladding and an outer layer called a buffer. The cladding, usually also glass, has an index of refraction lower than that of the core to insure that light is constrained for transmission within the core by total internal reflection. Typically the buffer is composed of plastic or polymer and serves to protect the inner layers mechanically and to prevent attack by moisture or other substances present in the fiber's environment. Commonly a plurality of individual fibers (in some cases as many as a thousand) constructed in this fashion are bundled together and enclosed in a protective jacket to form a cable.

Commonly used fibers may further be classified as multimode or single mode. Multimode fibers typically comprise cores having diameters of 50–62.5 $\mu$m but in some cases up to 100 $\mu$m. Single mode fibers generally have a much smaller core that may be 9 $\mu$m or less in diameter. The glass-cladding diameter is most commonly 125 $\mu$m but sometimes is 140 $\mu$m (with a 100 $\mu$m core). The exterior diameter is largely a function of the buffer coating, with 250 $\mu$m most common, although some fiber coatings may be as much as 900 $\mu$m in diameter. Alignment of fibers is a crucial part of the preparation for any splicing operation, but is especially challenging for single mode fibers that have small core diameter. In order to produce a high quality, low-loss splice, the two opposing ends to be joined must be aligned laterally to within a small fraction of the core diameter. Of course, the smaller the fiber diameter, the smaller the allowed deviation from perfect abutting alignment that may be tolerated.

Most fiber optic data transmission systems transmit information using electromagnetic radiation in the infrared band, including wavelengths such as 850 nm for multimode fibers and 1310 and 1550 nm for single mode fibers. The nomenclature "light" is invariably employed for this radiation, even though the cited wavelengths fall outside the range visible to humans.

Two general approaches for splicing optical fibers are in widespread use, viz. mechanical and fusion splicing. Mechanical splicing is accomplished by securing the ends of two fibers in intimate proximity with an aligning and holding structure. Often the fibers are inserted into the opposing ends of a precision ferrule, capillary tube, or comparable alignment structure. The fibers are then secured mechanically by crimping, clamping, or similar fastening. An adhesive is also commonly used. In some cases a transparent material such as a gel having an index of refraction similar to that of the fiber cores is used to bridge the gap between the fibers to minimize reflection losses associated with the splice. Mechanical splicing is conceptually simple, and minimal apparatus is required to effect splicing. However, even in the best case, a mechanical splice has relatively high and undesirable insertion loss, typically 0.20 dB. In addition, mechanical splices are generally weaker than the underlying fiber and are notoriously vulnerable to degradation of the optical quality of the splice over time, especially under adverse environmental conditions such as varying temperatures and high humidity. Mechanical splices are generally regarded as being temporary expedients at best and are not useful for high bandwidth systems or permanent joints.

Fusion splicing entails the welding of the two fiber ends to each other. That is, the ends are softened and brought into intimate contact. The softening is typically induced by a small electric arc struck between miniature pointed electrodes mounted in opposition and substantially perpendicular to the common axis of the fibers. Upon cooling, a strong, low-loss joint is formed. When properly carried out, fusion splices exhibit very low losses along with high stability and durability rivaling those of the uncut fiber. Mechanical protection is often provided by a heat-shrinkable tube applied over the completed joint. The tube replaces the buffer coating that generally must be removed prior to splicing. In many cases the heat-shrinkable tube is reinforced by incorporation therein of a length of metallic wire for stiffness.

As noted above, careful preparation and precise lateral alignment of the ends of the fibers being joined is essential for forming low loss splices in both ordinary and polarization maintaining optical fibers. The axes of the fibers must be collinear within about 0.1 degree and aligned laterally within a small fraction of the core diameter to achieve the desired loss of less than about 0.03 dB. This required precision of alignment presents a substantial technical challenge, especially with single-mode fibers having cores approximately 9 $\mu$m diameter. Three general approaches have been proposed in the prior art. The simplest expedient is the use of mechanical fixturing, such as the alignment ferrules described above and other forms of pre-aligned V-grooves and the like. These purely mechanical approaches do not reliably produce splices that maintain less than 0.10 dB loss and so are ill suited for the demands of advanced, high-bandwidth communications systems. More sophisticated approaches employ some form of optically assisted fiber positioning. One such method is termed a profile alignment system (PAS). In this approach, the splicing apparatus incorporates an optical system that acquires images of the two fibers taken in two lateral directions, allowing the fibers to be positioned in two directions orthogonal to the mutual fiber axes. PAS systems may incorporate either manual positioning or may employ computerized image processing to optimize the alignment. However, the diffraction limit and pixel size of available electro-optic detectors restricts the precision achievable with PAS, even in systems based on visible light with wavelengths of about 400–700 nm. This particularly compromises the effectiveness of PAS in aligning small diameter, single mode fibers.

Still more advanced positioning methods have been proposed that employ measurement of actual light transmission between the fibers being joined. The positioning of the fibers is adaptively adjusted to maximize light transmission prior to the fusion operation. It is found that under carefully controlled laboratory conditions this approach may permit alignment better than that achievable with PAS systems.

The need for improved methods is especially acute for joining polarization-maintaining fibers. Whereas ordinary single mode fibers must be aligned with each other laterally and longitudinally to within about 1 micron, and in angle to within a fraction of a degree, polarization-maintaining fibers must also be aligned azimuthally; that is, they must be rotated relative to each other about their common axis until the fast and slow axes in their respective cores are also aligned. This is because it is essential for the successful application of these fibers that the transmitted light remain in the preferred polarized mode—either fast or slow—in crossing the splice. If the mode alignment is off by more than about 1 degree very serious losses and dispersion occur. Not only does the projected power become divided between the two orthogonal modes of the receiving fiber, but the coupling into the originally-excited mode is very poor. The quality of such splices is often characterized by measured values of extinction ratio, polarization extinction ratio (PER), or crosstalk. An effective means of aligning such fibers is thus clearly desirable.

In U.S. Pat. No. 4,612,028, there is disclosed a polarization-preserving single mode fiber coupler made without mutually aligning the polarization axes of the fibers by twisting the fibers together over a selected length and fusing them. A critical requirement of this coupling method is that the initial misalignment be not close to 90 degrees.

As taught in U.S. Pat. Nos. 5,156,663 and 4,911,524, the principal manner of aligning polarization maintaining single mode fibers has heretofore been to rotate a first fiber relative to a second fiber while exciting the first fiber and monitoring the output from the second. That is, the first "transmitting" fiber must be aligned with a polarized light source for injection of light aligned with the preferred axis. Likewise, the output end of the "receiving" fiber must have its preferred axis aligned with a polarizing filter and detector. Thereafter, the ends of the fibers to be spliced or coupled are brought together in a suitable stage or housing, for instance on a fusion splicer. After the ends have been aligned laterally with each other in x, y, and z dimensions, to maximize the coupling of power across the gap, one fiber is rotated slowly relative to the other while the power received at the photo-detector is monitored. Eventually an orientation is found at which the coupling of power into the preferred axis is optimum. The fusion or mechanical splice is then completed, by fixing the oriented ends together permanently.

U.S. Pat. No. 5,244,977 to Anjan, et al. discloses a fiber optic polarization apparatus for use in the fabrication of fused optical couplers. U.S. Pat. No. 5,013,345 to Itoh, et al. discloses a method for fusion splicing of polarization maintaining optical fibers, while U.S. Pat. No. 5,149,350 to Itoh, et al. discloses an apparatus for fusion splicing of optical fibers.

U.S. Pat. No. 4,669,814 to Dyott discloses an optical fiber comprising a core and cladding having different refractive indices and forming a single-mode guiding region, where the core has a noncircular cross-section defining two refractive indices. Like the Anjan, et al. system, the Dyott system discloses a fiber in which light is injected along its length. The injection of light in the Dyott system is accomplished by a beam splitter.

Coupling of fibers using the methods described hereinabove require light to be injected along the length of the joining fibers. Rotational alignment is, alternatively, accomplished by the following methods: (1) coupled power monitoring, which is difficult and time consuming, and requires expensive input and output source and detector alignments; (2) axial imaging, which requires the fiber to have obvious and distinctive features; and (3) lateral imaging, in which the fiber must have obvious internal features amenable to a precisely-alignable image. With the first (power injection/ detection) fiber alignment method, the set-up required to power and monitor the fibers is difficult and time-consuming to establish. Highly-skilled personnel are required; and the splicing procedure is itself time-consuming. If more than one pair of fibers is to be spliced, the process time and procedural difficulty increase dramatically. Methods (2) and (3) depend on imaging distinctive internal physical features of the fibers. If alignment is to be automatic, the system therefore requires sophisticated, expensive, and delicate image processing technology. If it is to be manual, the ability of a user to visually match two low-contrast images is oftentimes not accurate enough to yield rotational alignments of the required precision of 1 degree or better. Furthermore, few PM fibers exhibit images with distinguishable features, either in the axial or lateral views. Thus methods (2) and (3) are both difficult to implement and limited in applicability to a small proportion of the available PM fibers.

A system for splicing polarization-maintaining single mode optical fibers is disclosed by U.S. Pat. No. 6,203,214 to Wesson. The fibers are transversely illuminated and asymmetric stress in the fiber tip is measured using the photoelastic effect during rotation of the fibers about their long axes. The fibers are then rotated around their longitudinal axis to align their respective polarization axes and then joined together to produce a single polarization-maintaining optical fiber. The contents of U.S. Pat. No. 6,203,214 are incorporated herein in the entirety by reference thereto.

Notwithstanding numerous advances in the field of fiber optic joining, there remains a need in the art for an economical, efficient process for forming low-loss, durable, and reliable splices in polarization-maintaining fiber optic cables.

SUMMARY OF THE INVENTION

The present invention provides a method and means for fusion joining two separate polarization-maintaining optical fibers. Asymmetric stress in the tip of such fiber transversely illuminated with polarized light is measured using the photoelastic effect to determine the fiber polarization axes of two fibers appointed to be joined. The fibers are rotated around their common longitudinal axis to align their respective polarization axes and joined together. In this manner, a single polarization-maintaining optical fiber is produced.

Generally stated, the invention provides an automatable apparatus for aligning and joining a first and a second polarization-maintaining optical fiber, comprising: a first measuring means for measuring a first transverse intensity function of the first optical fiber; a second measuring means for measuring a second transverse intensity function of the second optical fiber; a first rotation means for rotating the first optical fiber about an axis through the length of the first optical fiber; a second rotation means for rotating the second optical fiber about an axis through the length of the second optical fiber; a memory means for storing the first transverse intensity function and the second transverse intensity function; a microprocessor means for controlling the first rotation means and the second rotation means, the microprocessor means being operative to identify first fiber polarization axes from the first transverse intensity function, second fiber polarization axes from the second transverse intensity function, and the angular difference between the first fiber polarization axes and second fiber polarization axes; a software means for directing the microprocessor means to cause the first and second rotating means to rotate their respective optical fibers to bring their polarization axes into azimuthal alignment; a lateral alignment means for laterally aligning a first end surface of the first optical fiber with a second end surface of the second optical fiber, whereby the first end surface and the second end surface are brought into coincident, lateral alignment, forming a boundary between the first optical fiber and the second optical fiber; and a fiber joining means, preferably an electric arc fusion welding system.

In one aspect of the invention, there is provided an apparatus for aligning and joining two optical fibers, comprising: illumination means for projecting polarized light transversely through first and second optical fibers having discrete lengths and observable, internal asymmetric stress; polarized light detection means for receiving the light passed transversely through said fibers and producing therefrom an electrically detected signal; measuring means for creating first and second transverse intensity functions from variations in said electrically detected signal as said first and second optical fibers are rotated; rotation means for rotating each of said first and second optical fibers about an axis through the lengths of said fibers; and alignment means for laterally aligning a first end surface of said first optical fiber with a second end surface of said second optical fiber, whereby said first end surface and said second end surface are coincident and form a boundary between said first optical fiber and said second optical fiber.

In an aspect of the invention, the splicing system comprises an imaging optical system having a fiber imaging illuminator including a first light source for the first imaging direction and a second light source for the second imaging direction; and an image detector, preferably comprising a CMOS electro-optical device. Preferably the optical system has a compact, folded optical path to minimize the profile of the splicing stage and the splicing head. Light from the first source traverses a first optical path and light from the second source traverses a second optical path, each of the paths being multiply folded. The imaging optical system comprises optical elements located above and below the horizontal plane and the first and second optical paths lie in a plane perpendicular to the common fiber axis.

The loss and mode dispersion of the spliced fibers are preferably minimized by use of automatically driven, active optical systems for adaptively aligning the cores of the two fibers both laterally and azimuthally prior to fusion. The optimization of fiber alignment of is preferably carried out using at least one of a PAS or a LID system. Suitable electronic commands are issued to the motion means from either the PAS or LID systems to bring the fibers into collinear alignment.

In some embodiments the system advantageously incorporates a profile alignment (PAS) system in communication with the fiber image detector and the motion means, and the PAS system is adapted to automatically command the motion means to bring the fibers into lateral alignment prior to the fusion operation.

Such systems in some embodiments employ a profile alignment (PAS) system that employs a compact, imaging optical system incorporated in a fusion splicing head of the system. In the PAS technique, the relative positions of the fiber ends is estimated using electronic analysis of optical images taken in two non-coincident, preferably orthogonal, directions. Motion means are then used to move the fibers accordingly into lateral alignment. Preferably the PAS system is operated iteratively to further improve the alignment.

More preferably, embodiments of the system incorporate a local injection and detection (LID) system in carrying out the alignment. In the LID technique, optimal alignment is signaled by maximization of the transmission of light across the interface between the fibers.

It is more preferred that the system employ a local injection and detection system in carrying out lateral fiber alignment. In an embodiment of a LID-based system, the splicing head of the system includes a local light injector and a detector that provides an electronic intensity signal indicative of the fraction of the injected light propagated across the interface between the fibers; and the electronic control circuitry comprises: (i) a driver energizing the light injector, (ii) measurement electronics connected to the light detector receiving and processing the electronic intensity signal to provide a measured intensity signal, and (iii) a servo system operative to drive the motion means to maximize the measured intensity signal, whereby the relative position of the fibers is optimized prior to fusion.

Advantageously, the present system in its various embodiments allows the fibers to be efficiently and precisely aligned prior to fusion. Accurate alignment advantageously results in a low-loss joint, i.e., a joint through which a light signal may propagate with its signal strength and mode integrity maintained, because the attenuation and back reflection attributable to the joint are rendered extremely low. Preferably, joints made with the present apparatus have an average loss of less than about 0.03 dB, and more preferably, an average of less than about 0.02 dB. Most preferably, every joint has a loss of less than about 0.02 dB.

The method and apparatus of the present invention afford significant advantages over previous alignment systems. Inasmuch as the fibers appointed for alignment need not be coupled at their far ends to source and detector, the alignment set-up procedure is less complex. Coupling is readily effected in an accurate, reliable manner without need of skilled personnel, and the time and cost required for splicing polarization-maintaining single mode fiber is reduced.

BRIEF DESCRIPTION OF THE DRAWINGS

The invention will be more fully understood and further advantages will become apparent when reference is had to the following detailed description of the various embodiments of the invention and the accompanying drawings, wherein like reference numerals denote similar elements throughout the several views, and in which:

FIG. 6b is a perspective view depicting schematically a right fiber positioning assembly of the invention that is generally a complementary, mirror image of the left fiber positioning assembly depicted by FIG. 6a;

FIG. 7a is a side elevation view depicting schematically a right PM measurement optics assembly and the end of the right fiber positioning assembly more fully depicted by FIG. 6b that are employed in the fiber splicing system of the invention;

FIG. 7b is a cross-section view taken at level D—D of FIG. 7a of the measurement optics assembly and the right fiber positioning assembly used in the fiber splicing system of the invention;

FIG. 8a is a side elevation view depicting in greater detail the left fiber clamp also seen in FIG. 6a; and FIG. 8b is a side elevation view depicting in greater detail the support of an optical fiber by the left fiber clamp and left V-fence also seen in FIGS. 6a and 8a.

DETAILED DESCRIPTION OF THE PREFERRED EMBODIMENTS

The present invention is directed to an apparatus and system for producing a durable fusion splice between a first and a second polarization-maintaining optical fiber. The joined fiber advantageously exhibits low attenuation. Advantageously the present system employs an adaptive technique to optimize the lateral and azimuthal alignment of the fibers prior to fusion, whereby the insertion loss and mode cross-coupling of the splice are minimized.

Polarization-maintaining fibers exhibit asymmetric stresses. In most such fibers the stresses are created deliberately, as the decoupling of the two degenerate polarized modes is achieved by refractive index changes due to stress. The unequal stresses result in very different propagation constants for the two orthogonal modes, which reduce cross-coupling to a very low level, typically −20 to −30 dB. The asymmetric stresses are achieved by the use of an elliptical inner cladding layer (3M and Hitachi), a bow-tie-shaped pair of regions (York), a pair of rods (Panda), or some other internal glass structure with a thermal expansion coefficient different from that of the fiber core and the rest of the cylindrical fiber cladding.

Other fibers, such as those made by Andrew and Corning, are "form birefringent." In these cases, the core may be elliptical so as to impose different propagation constants on the two modes. Even though asymmetric stress is not imposed deliberately, it can be expected that since there are different coefficients of thermal expansion in the various fiber layers, form asymmetry leads automatically and unavoidably to stress asymmetry. Although the stress levels may be lower than in stress-birefringent fibers, they are still detectable.

Figure 1:
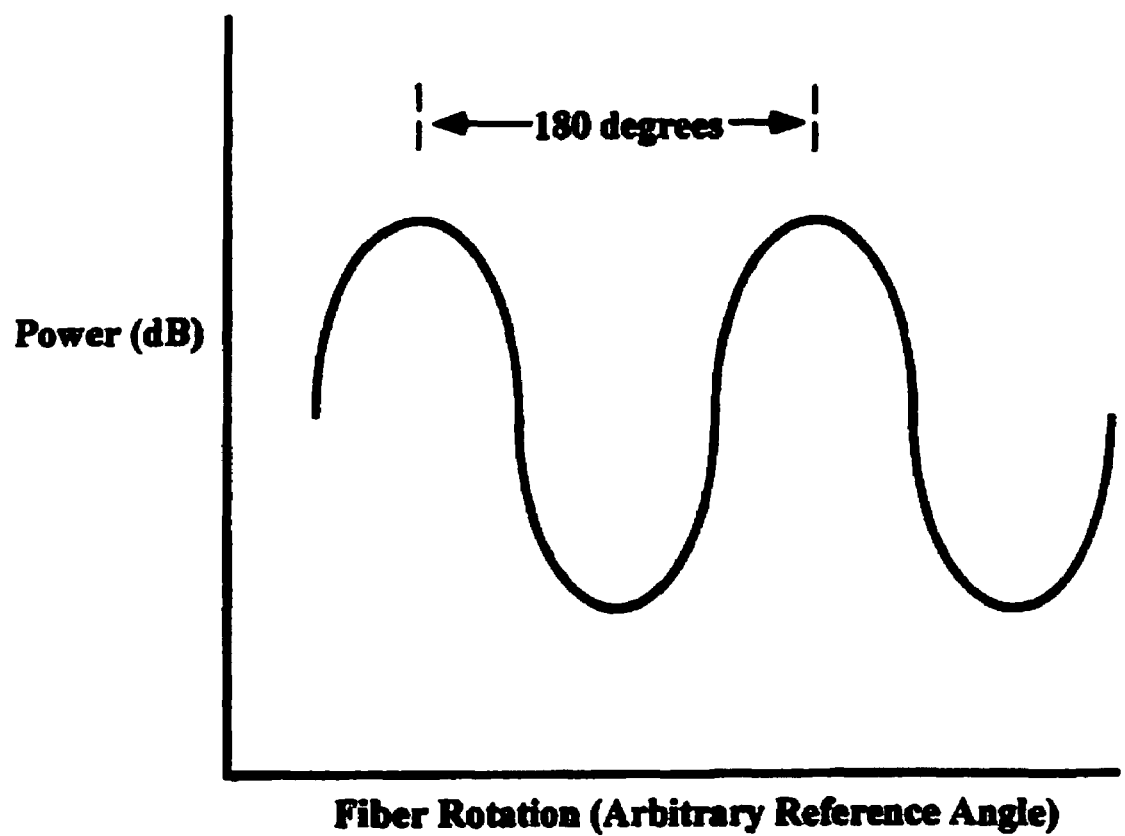
FIG. 1 is a schematic of a typical transverse intensity function.

When an illumination means is used to project polarized light through the fiber transversely or perpendicular to the fiber's length, the stresses in the fiber introduce phase delays in the light according to the photoelastic effect. When the transmitted polarized light is allowed to fall on a polarized light detection means for receiving the light passed transversely through the fiber, the amount of light which reaches the detector varies with the fiber's rotation. That is, as the stressed region of the fiber is rotated relative to the transverse polarized light, the phase delay it creates in the light varies, changing the polarization state of the light. When the altered polarized light falls on a polarized detection means, the amount of light which can pass through to be detected and converted to an electrical signal varies. Rotation of the fiber results in variation of the detector signal. This variation of the detector signal resulting from transverse light modulation is hereinafter referred to as a transverse intensity function. The transverse intensity function is easily amplified electronically and correlated with the orientation of the fiber. FIG. 1 is a schematic representation of a typical transverse intensity function, where the features are related to the fiber's polarization axes.

In the case of fiber made by Hitachi, the relative phase delay between two components of the polarized beam is estimated to reach a maximum of 0.68 radian when the direction of the transverse illumination is parallel to the long axis of the ellipse and 0.27 radian when it is along the short axis. This indicates that the phase delays to be expected will be single-order and usually much less than $\pi/2$; thus they will be unambiguous, and only a single peak will be expected to occur in the transverse intensity function for each 180 degrees of fiber rotation.

Figure 2:
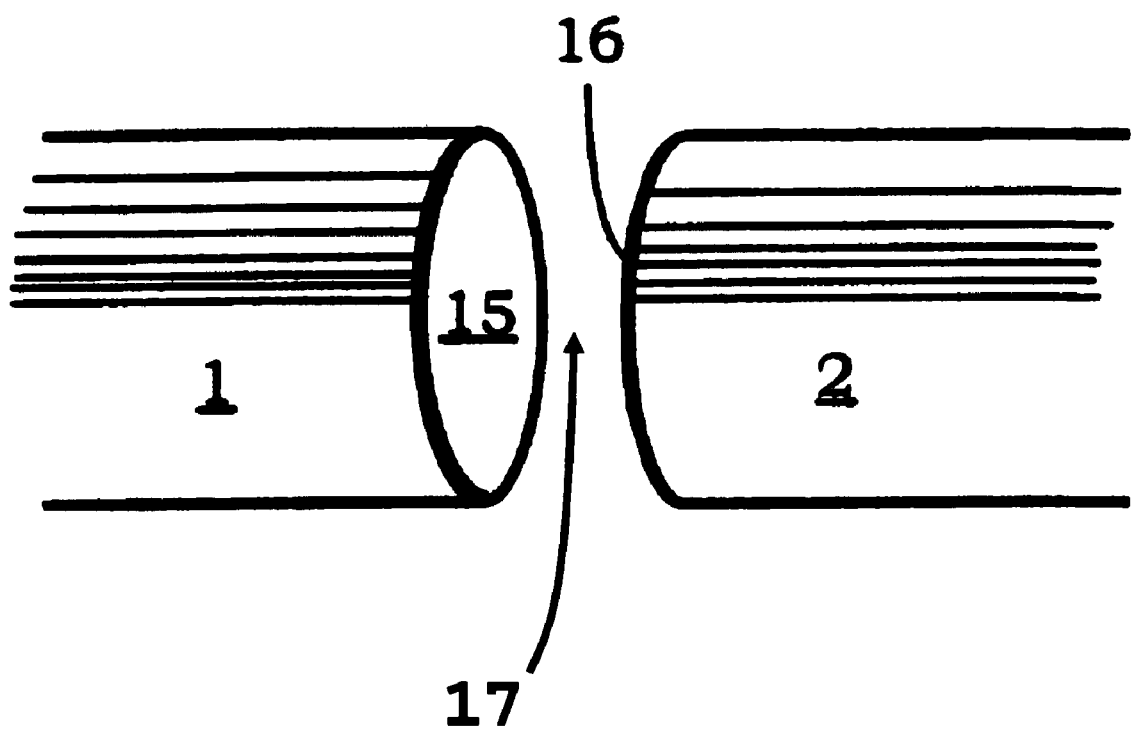
FIG. 2 is a perspective view of two fiber ends.

FIG. 2 depicts generally a first optical fiber 1 and a second optical fiber 2 appointed to be joined. The free end of first optical fiber 1 and the free end of second optical fiber 2 are butted against each other such that the first end surface 15 of the first optical fiber 1 and the second end surface 16 of the second optical fiber 2 are coincident, or laterally aligned, forming a boundary 17 or point of abutment between the first optical fiber 1 and the second optical fiber 2. A joining means is used to join first optical fiber 1 at first end surface 15 to second optical fiber 2 at second end surface 16. The joining means is a member of the group consisting of arc discharge, microflame, filament, glue (for instance, epoxy) in a capillary, mechanical clamping in a common V groove, and laser. Optionally, optical fiber 1 and optical fiber 2 are separated by a short gap and their free ends are fire polished to remove defects, before they are butted together while the joining means 10 is applied.

The present system may use any splicing method but preferably employs an electric arc welding system for joining the fibers by fusion splicing. Preferably the system employs a pair of miniature electrodes mounted in horizontal, transverse, axially opposed relationship at the point of fiber abutment. The electrodes are energized by a high voltage supply, triggered automatically by control electronics after completion of fine fiber alignment.

A suitable arc softens and welds the fiber ends to form a durable, low loss splice. Known electrical supply means are used to drive the arc in a reliable manner, the electrical characteristics thereof being preselected through the user interface. Too intense an arc melts the fibers excessively, causing formation of a ball-like end that retreats from the joint area. Too weak an arc does not allow enough heating to cause a mechanically stable joint to form.

The fusion operation is initiated by preparing the fibers, preferably by removing the buffer and cladding layers, if any, from the fiber, and also cleaving the ends of the fibers to provide a joining surface at the end of each that is substantially planar and perpendicular to the fiber axis. The respective fibers are then placed in the clamp assemblies of the system. These clamp assemblies preferably comprise precision V-blocks, of a form typically used in machining operations, with clamps to hold the fibers securely therein. Even though the V-blocks hold the respective fibers in approximate collinear alignment, the accuracy of the axial separation and lateral positioning after initial mounting are inadequate to form a high-quality joint. Therefore, the splicing stage is preferably provided with electronically controlled motion means for adaptively bringing the fibers into lateral and azimuthal alignment that is sufficiently precise to produce a low transmission loss splice.

Figure 3:
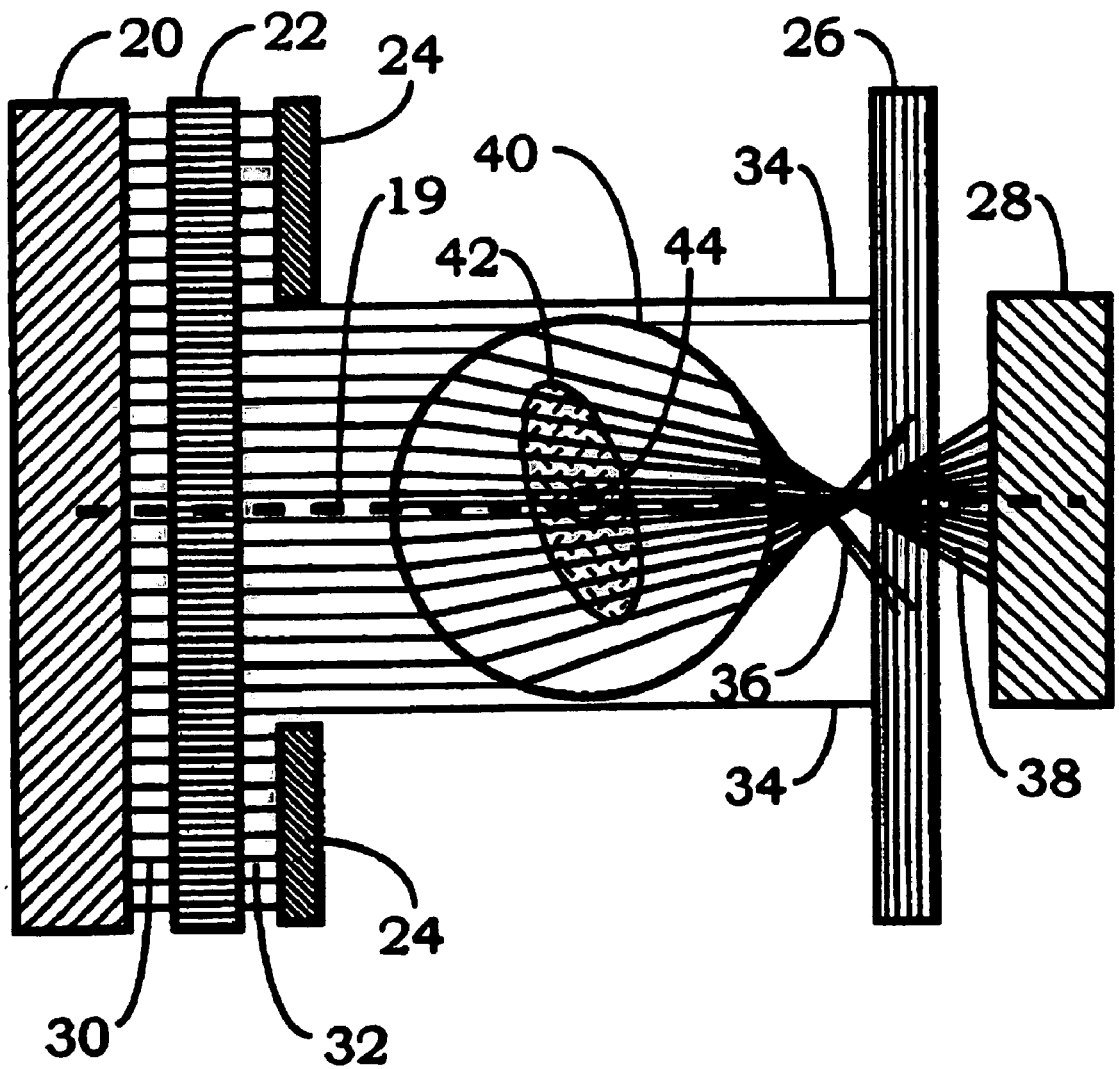
FIG. 3 shows a cross-sectional view of a polarization-maintaining optical fiber transversely illuminated with polarized light.

FIG. 3 depicts a system for obtaining a transverse intensity function of a polarization-maintaining optical fiber 40. Illumination means 20 generates a first light 30 along first light path 19. Illumination means 20 is a member of the group consisting of laser, laser diode, incandescent bulb, LED, and quartz lamp. A first light polarizing means 22 causes light 30 to become polarized light 32, having a first polarization direction. The aperture 24 limits the area of first polarized light 32 to illuminate optical fiber 40. The polarized light 32 transversely illuminates optical fiber 40, i.e., the light is incident on the fiber perpendicular to its length. For illustrative purposes, optical fiber 40 is shown with an elliptical clad 42 and core 44, but it should be understood that other forms of optical fiber may also be examined with this system. Polarized light 32 entering optical fiber 40 undergoes a change in polarization depending on the stresses in its path through the fiber. The light continues along light path 19, and in turn, impinges upon a second polarizing means 26. The second polarizing means 26 has a second polarization axis perpendicular to the first polarization direction of polarized light 32. The condition of the second polarizing filter 26 being 180 degrees out of phase with the first polarized light 32, the second polarizing means 26 rejects or filters light that does not traverse the fiber 40, shown in FIG. 3 as 34 and 36. Light that does traverse the stressed region 42 is altered in polarization state depending on the stress effects integrated over the path. Depending on the final polarization state of any ray of the light, some portion thereof, shown in the FIG. 3 as 38, will pass through the second polarizing filter 26 to be detected by light detection means 28. Light detection means 28 is any element whose electrical characteristics change in response to the incidence thereon of light of the wavelength demitted by means 20, but preferably is a member of the group consisting of photo-transistor, silicon detector, photo-diode, avalanche photodiode (APD), photo-resistor, photo-cell, and Si or InGaAs PIN diode detector. Optionally, focusing optics are positioned along light path 19, for instance between the optical fiber 40 and light detector 28. The light responsive element used in each vertical optical system may comprise any electronic element A Si PIN diode is preferred for its availability, low cost, low noise, and immunity to radiation of wavelength longer than about 1050 nm. It is also preferred that a filter that substantially transmits the light from the source but excludes other wavelengths be included in front of the light responsive element.

Some embodiments of the present system incorporate further data and communication elements, such as storage of a log memorializing routine calibrations, splicing events and data associated therewith, such as insertion loss and positioning information, and images of the spliced fiber. Such information is optionally printed by a printer in communication with the present system using any communications system and protocol or uploadable to a computer by wired or wireless interface protocols known in the art or by storage in a writeable data storage means. Such storage may be implemented using any form of semiconductor, magnetic, or ferroelectric computer memory or the like or by a removable mass storage medium such as a magnetic or optical disk, flash memory modules, or other known removable semiconductor, magnetic, or ferroelectric memory modules.

The first stage of aligning the fibers may be carried out manually, preferably with the assistance of images of the respective fibers taken in two mutually perpendicular optical directions normal to the common fiber axis. More preferably, the alignment comprises use of an automated profile alignment (PAS) system to carry out an initial three-dimensional, lateral alignment. The PAS system employs electronic processing of the fiber images to spatially locate the fibers and quantitatively determine their misalignment. The lateral positioning system in the present system is then actuated to bring the fibers into alignment. The process may be carried out iteratively until the alignment is within the measurement tolerance and resolution of the PAS optical system. In general, the precision of alignment achievable with PAS is limited by the diffraction limit and the resolution of available electro-optical detectors such as charge-coupled and CMOS cameras and the associated optical systems.

To overcome the inherent limits of a PAS-based splicing system, the alignment sequence in an aspect of the present method and system optionally employs a local injection and detection (LID) system. The LID system incorporates means for injecting light into the first fiber through its buffer layer and corresponding means for detecting the intensity of light emerging through the buffer layer of a second fiber. Optimal lateral fiber alignment prior to splicing is effected by manipulating the orientation and relative position of the fibers to maximize light transmission. In the LID method, light incident on the buffer jacket of the first fiber at an injection position penetrates the buffer and cladding, enters the core, and propagates through the first fiber, gap, and second fiber, emerging from the core of the second fiber through its cladding and buffer at a detection position. These processes require that the fibers be bent at the injection and detection positions. Otherwise, light is constrained by total internal reflection to remain in the fiber core and solely to propagate therethrough.

Figure 4:
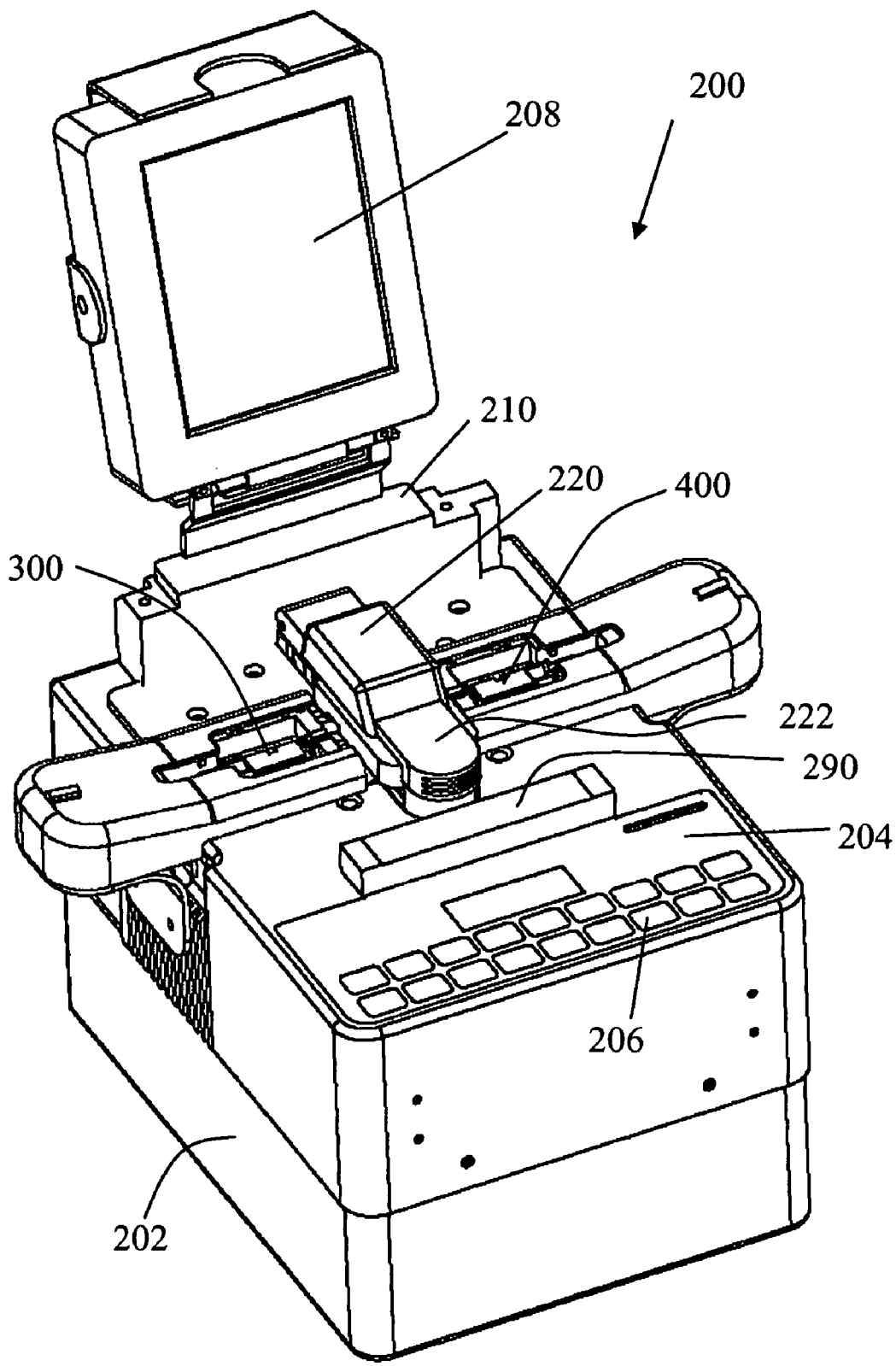
FIG. 4 is a perspective view depicting schematically a fiber splicing system of the invention.

An implementation of the fiber splicing system 200 of the invention is depicted by FIG. 4. The system is housed in case 202 and includes the systems needed to suitably align the fibers and accomplish fusion splicing under automatic control. The splicing system further comprises a control panel 204 including keypad 206, power and control electronics, and a video display monitor 208 attached by monitor mount 210. In other embodiments of the system monitor 208 includes touch-screen functionality used as an alternative to keypad 206. The optical system that provides the information needed to align the fibers in an azimuthal orientation that preserve polarization mode integrity is located generally vertically under PM optics cover 220, while the electric arc welding fusion system is protected by fusion cover 222. The fibers being joined are held and manipulated in axial, lateral, and azimuthal directions by left and right fiber positioning assemblies 300, 400, which are generally in mirror image. An oven 290 optionally permits heat-shrinking a protective sheath encapsulating the completed splice.

Figure 5:
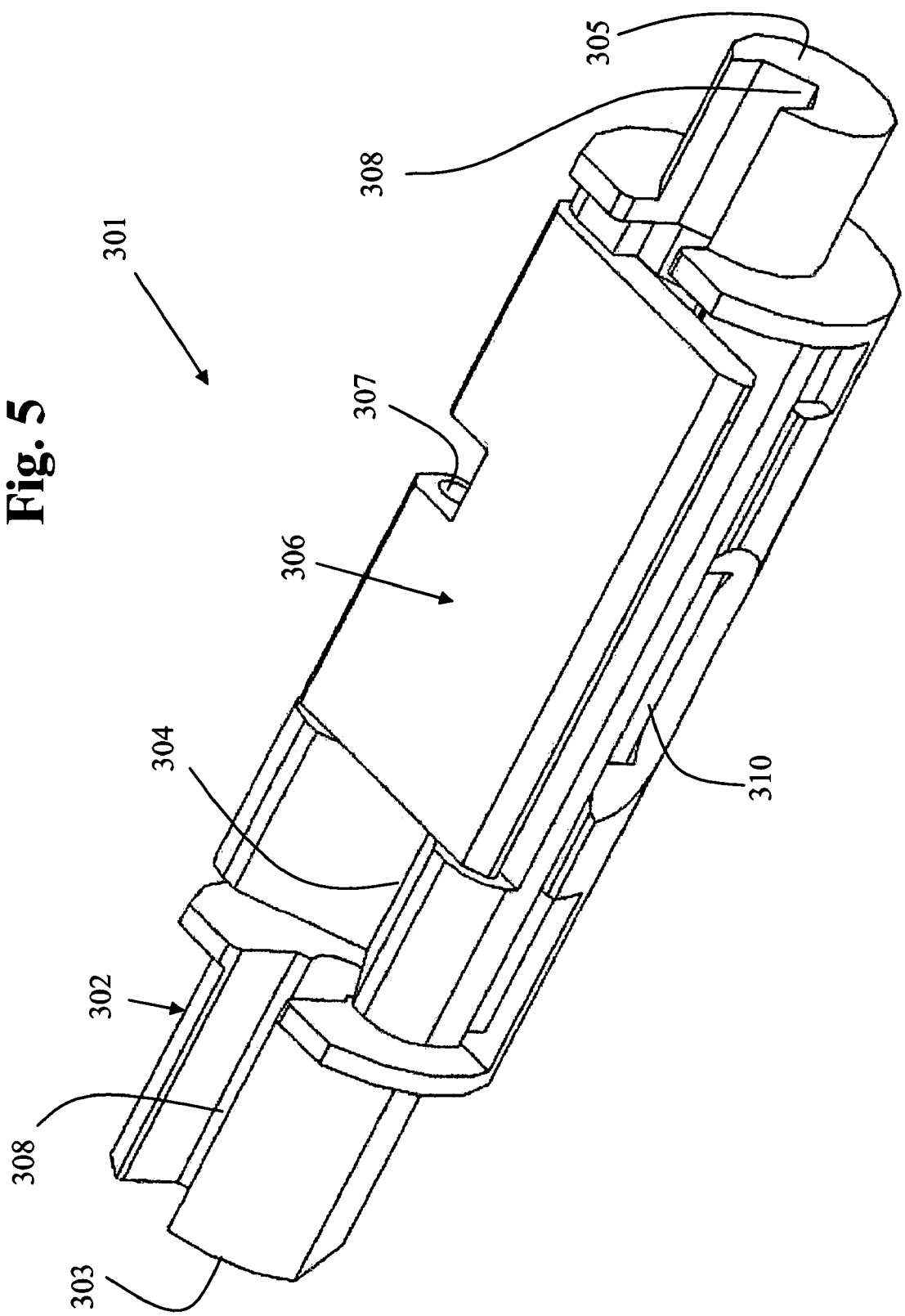
FIG. 5 is a perspective view depicting schematically a rotating stage assembly comprised in the fiber splicing system of the invention.

Referring now to FIG. 5 there is depicted left rotating stage assembly 301 having a drive end 303 and a fiber splicing end 305. Polarization-maintaining left fiber 1 is placed in assembly 301 and secured in generally V-bottomed fiber clearance slot 308, which extends substantially the full length of assembly 301. Left buffer clamp 306 is rotatably openable about an axially extending pivot 307. Thumb access notch 310 facilitates opening assembly 301 to allow insertion of fiber 1. Preferably, buffer clamp 306 incorporates one or more springs by which it is biased to open and one or more magnets that bias it closed. By suitable selection of the spring and magnet, clamp 306 is stable in either position. At a suitable, almost-closed point, the magnet overcomes the resisting spring force to make the assembly self-closing and able to engage fiber 1 on its outer buffer layer with sufficient pressure to permit stage assembly 301 to rotate fiber I azimuthally, about its fiber axis direction, without appreciable slippage or hysteresis.

Figure 6A:
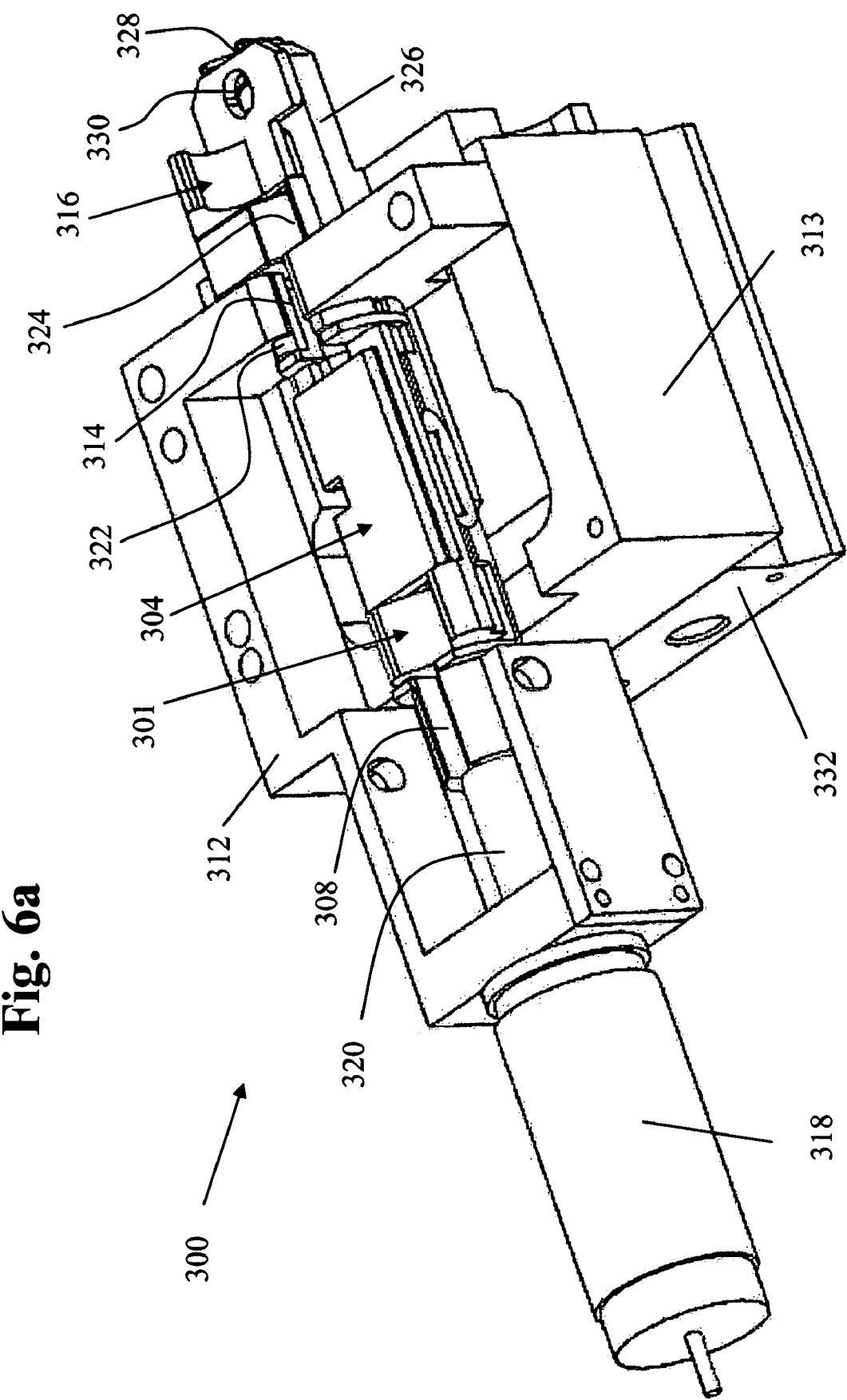
FIG. 6a is a perspective view depicting schematically a left fiber positioning assembly of the invention that includes the rotating stage assembly depicted by FIG. 5.

Left rotating stage assembly 301 is disposed within left fiber positioning assembly 300, in a manner best visualized in FIG. 6a. The assembly is supported by left rotator assembly bracket 312, which is attached to left positioner housing 313 and left positioner dovetail base 332. Rotating assembly 301 is attached at drive end 303 to a drive means, such as stepper motor 318, through flexible coupling 320.

The opposite end 305 passes through bushing 322 which supports the assembly for smooth rotation. Access slot 314 in bracket 312 allows insertion of the fiber. Fiber 1 is further secured by left fiber clamp assembly 316. The end of fiber 1 appointed for splicing emerges from fiber splicing end 305 of assembly 301 and extends through left V-groove 324 and left front V-fence 328. Left polarized light projection hole 330 permits vertically incident polarized light emitted downwardly to impinge transversely onto fiber 1 and pass to a detector (not shown) disposed below the fiber axis.

Figure 6B:
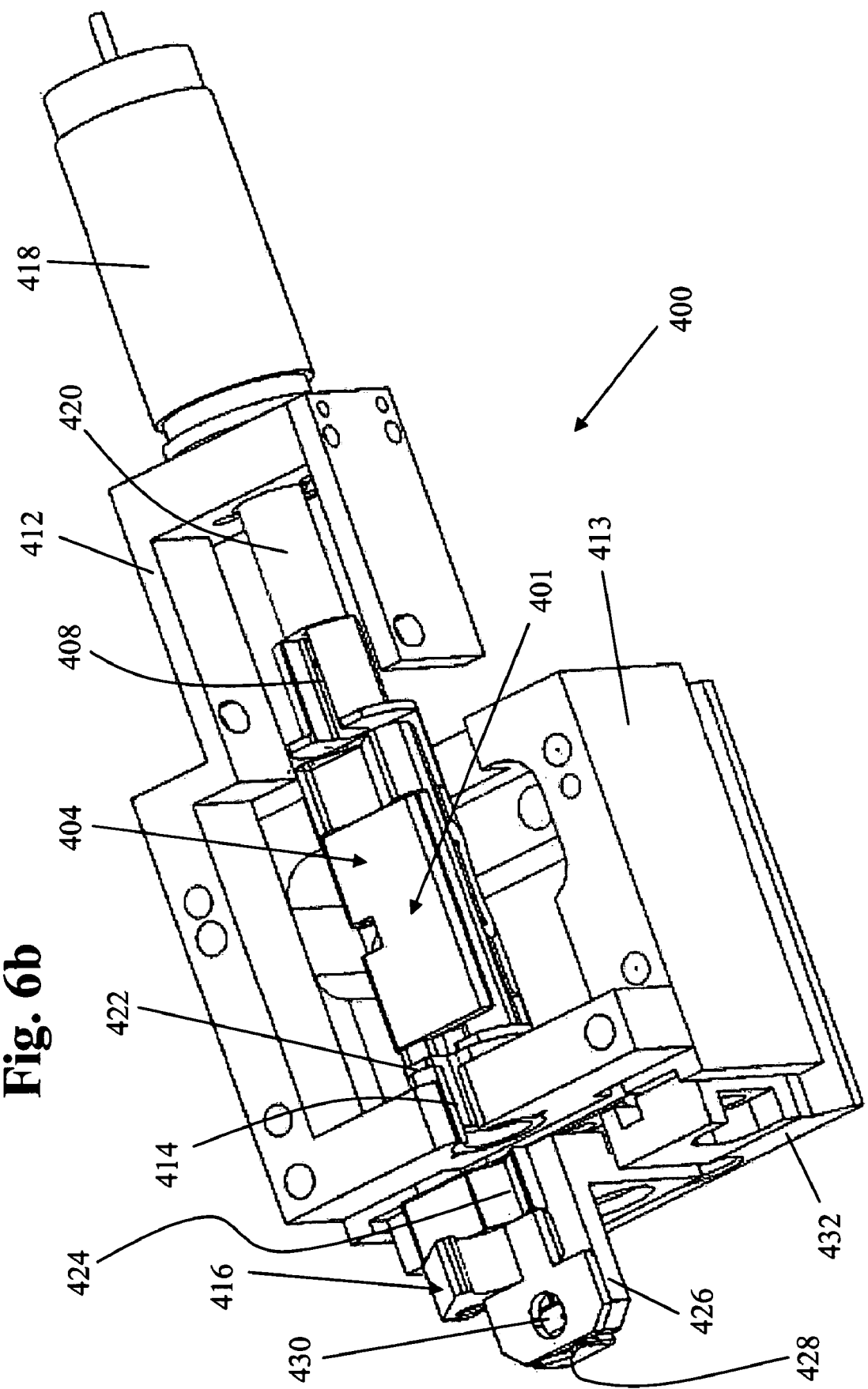

Complementary right rotating stage assembly 401 is generally a mirror image of assembly 301 and is disposed within right fiber positioning assembly 400, as best visualized in FIG. 6b. Assembly 401 is supported by right rotator assembly bracket 412, which is attached to right positioner housing 413 and right positioner dovetail base 432. Rotating assembly 401 is attached at one end to a drive means, such as stepper motor 418, through flexible coupling 420. The other end passes through bushing 422 which supports the assembly for smooth rotation. Access slot 414 in bracket 412 allows insertion of fiber 2, which is further secured by right fiber clamp assembly 416 with the end appointed for splicing extending o79olarized light projection hole 430 permits vertically incident polarized light emitted from LED 504 to impinge transversely onto fiber 2 and pass to a detector 514 disposed below the fiber axis.

Figure 8B:
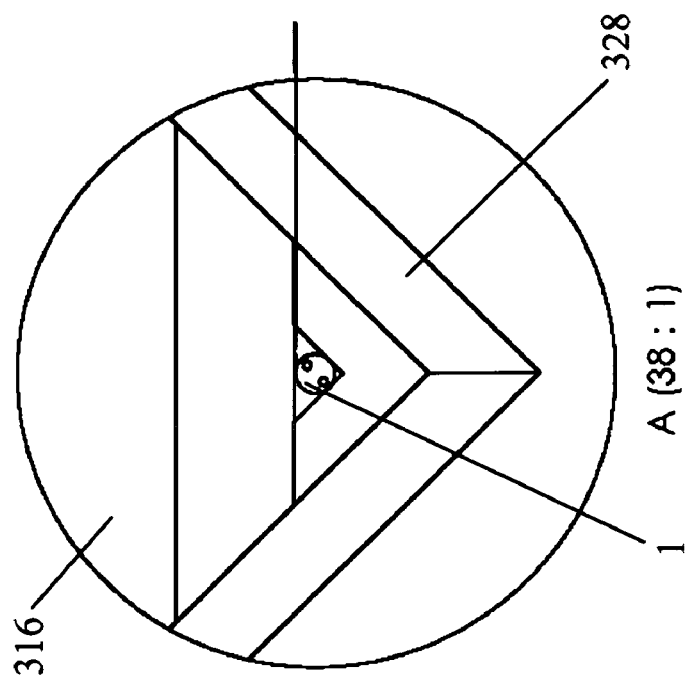
Figure 8A:
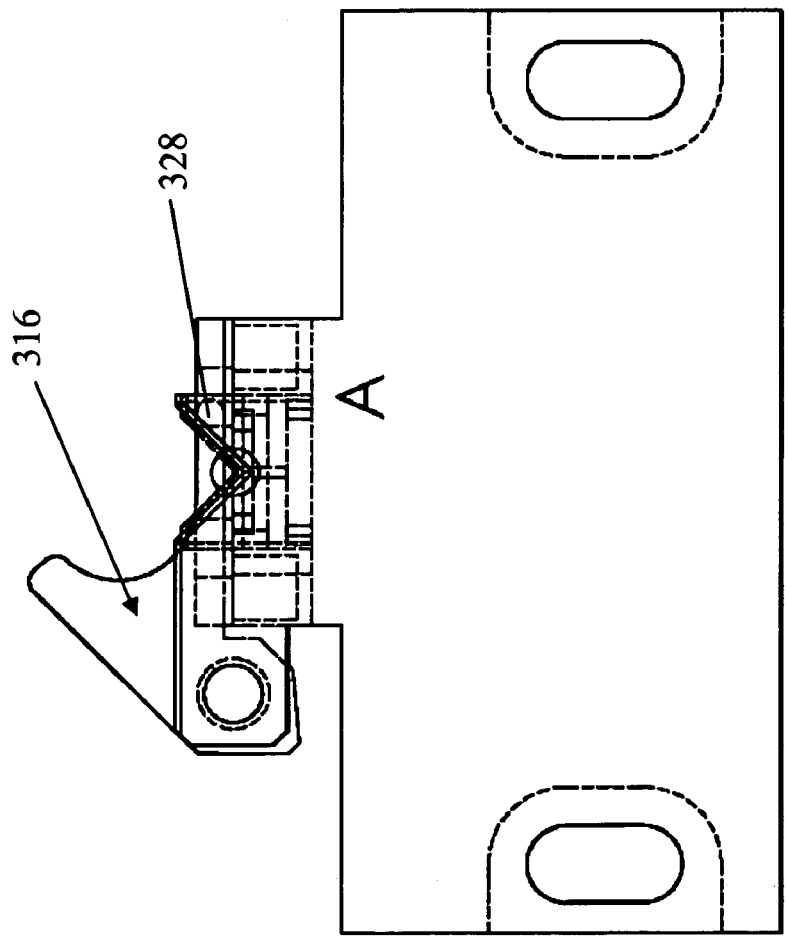

The cooperation of fiber clamp assembly 316, fiber guide 346, V-groove 324, and front V-fence 328 in securing fiber 1 for alignment is further elucidated by reference to FIGS. 8a–8b. In particular, V-fence 328 and fiber clamp assembly 316 form an opening having the shape of an isosceles triangle oriented with its symmetric vertex downward and its opposite side horizontally disposed. The sides of the triangular opening circumscribe the generally circular shape of the fiber, e.g. a fiber having a 125 $\mu$m buffer diameter. The opening has a size sufficiently large to permit the fiber to rotate therewithin but small enough to support the fiber during the rotation, preventing wobble and runout Preferably the opening circumscribes a circle that is at most 8 $\mu$m larger in diameter than the fiber, and more preferably, at most about 3 $\mu$m larger. In addition, it is preferred that the opening take the shape of a right isosceles triangle. To achieve high accuracy of lateral and azimuthal alignment, it is desirable that fiber 1 be supported in a way that minimizes runout during the rotation used to acquire the transverse intensity function. In addition, the support desirably does not result in friction producing rotational hysteresis. Under these conditions, the azimuthal orientation of the fiber and the structure therein that defines the fast and slow propagation mode directions can be associated reliably with the rotation of the rotating clamp assembly used to turn the fiber.

Fiber 1 is further secured by clamp assembly 316 and buffer clamp 306. In preparation for splicing, buffer and cladding are stripped from the end portion of fiber 1. The fiber is secured with its buffer-coated portion under buffer clamp 306 and through fiber-splicing end 308 of shaft 302. The buffer-coated portion projects from fiber guide 326. The bare portion extends from outside V-fence 328 to about the intended point of abutment with mating fiber 2. Optical fiber buffers are typically relatively compliant, allowing the holding action of clamp 306 to secure the fiber for rotation without slippage or hysteresis.

The structure of right fiber clamp assembly 416, fiber guide 426, V-groove 424, and front V-fence 428 are complementary those of their left counterparts. As a result, the second fiber is prepared, mounted, secured, and rotated in a similar manner.

An embodiment of the invention incorporating fiber positioning assemblies 300 and 400 facilitates accurate azimuthal alignment of fibers 1 and 2 prior to splicing. In addition, assemblies 300 and 400 comprise motion means for laterally aligning the fibers in three mutually orthogonal directions, viz. the axial direction (z) along the common fiber axis and two transverse (x, y) directions. Preferably the motion means employs electric motors or piezoelectric actuators to carry out these motions. In addition, the alignment is preferably accomplished under the direction of a PAS or LID system. While stepper motors and piezoelectric actuators are presently preferred for carrying out the lateral and azimuthal alignment disclosed herein, other forms of pneumatic and electromechanical actuators capable of producing the requisite extent of linear or rotary motion may also be used in practicing the present invention. 27

FIGS. 7a–7b generally illustrate right PM measurement optics assembly 500 used in conjunction with right fiber positioning assembly 400. A similar, complementary left PM measurement optics assembly is used with left fiber positioning assembly 300. Projector 502 comprises any light source such as light-emitting diode (LED) 504 adapted to emit light downwardly along the axis of vertical sensing tube 506, through right polarized light projection hole 430, and onto fiber 2 there below. LED 504 is secured in knob 505 of tube 506 by gluing, press fitting, or with one or more set screws. Preferably LED 504 incorporates a focusing lens in its package, but one or more separate lenses may optionally be used as well. At the bottom of tube 506 is provided a source polarizing means, such as source polarizer 508, adapted to linearly polarize the light incident on fiber 2 with a polarization direction preferably 45° from the fiber axis. Right PM measurement optics assembly 500 further comprises an analyzing polarizing means, such as analyzing polarizer 510 secured in fiber guide 446. A hole, or more preferably a slot 512 elongated generally in the fiber direction, below polarizer 510 permits light to impinge on a light responsive element 514, which may comprise any electronic element whose electrical characteristics change in response to the incidence of light thereon. Preferably the light responsive element comprises a phototransistor, Si or InGaAs PIN diode, avalanche photodiode (APD), or other element electrically responsive to light of the wavelength emitted by LED 504 or other light source. A Si PIN diode is especially preferred for its availability, low cost, low noise, and immunity to radiation of wavelength longer than about 1050 nm. Preferably, the interior of tube 506 and other nearby surfaces is made smooth and highly optically absorbing to reduce the amount of extraneous and scattered light impinging on detector 514. In addition, filter 516, which preferentially transmits light of the wavelength emitted by LED 504, is optionally interposed between polarizer 510 and light responsive element 514 to further reduce background.

Vertical sensing tube 506 is rotatably mounted to allow the polarizing directions of source polarizer 508 and analyzing polarizer 510 to be made perpendicular, preferably within about 1°, more preferably within about 0.25°, and most preferably within about 0.1°. In principle, exact perpendicular alignment of the polarizers substantially completely blocks the direct passage of light from source 504 to detector 514. As a result, only light phase-shifted by passage through the fibers is sensed. Knob 505 preferably is provided with at least one radially directed blind hole 520, permitting use of a tool for rotating the knob to carry out the polarizer alignment. Proper alignment, along with the aforementioned surface treatment, advantageously minimizes the background light. The signal registered by detector 514 comprises contributions from both the signal of interest that varies with the azimuthal orientation of the fibers and the superimposed, relatively constant background level. By reducing the background level as much as possible, the signal to noise ratio increases, which, in turn, desirably improves the accuracy with which the two fibers may be azimuthally aligned.

The invention further provides a method for aligning the fibers both laterally and azimuthally. In operation, rotating assemblies 301, 401 are used to rotate each of fibers 1, 2 through an angle of approximately 240°, taken from about −120° to +120° relative to the initial orientation of each fiber to obtain transverse intensity functions.

Azimuthal alignment is accomplished using a cross-correlation technique. First, an intensity function is mapped for each fiber. Each fiber is rotated azimuthally, i.e. along its long axis, by a series of n even angular steps encompassing an angular range of $\Theta$, wherein $\Theta$ is at least an angle of 180° and preferably at least about 240°, with the detected intensity recorded at each step, yielding a pair of respective transverse intensity functions $L(i)$, $R(i)$, for $1=0$ to n. A cross-correlation function $S(j)$ is then calculated mathematically for $j=0$ to n, defined by $S(j)=(1/n)\Sigma_i[L(i)R(i+j)]$, wherein the summation extends from $i=0$ to n. A peak in the function $S(j)$ occurs at a particular value of $j=k$, where k is some value between 0 and n. Preferably, an electronic rotation analysis means carries out these calculations, along with determining a first rotation correction for said first fiber and a second rotation correction for said second fiber. A rotation control means in communication with the rotation means and the rotation analysis means directs the rotation means to rotate the first fiber by the first rotation correction and the second fiber by the second rotation correction. Together these corrections act to cause a relative rotation of the fibers by an angle $\Sigma/k$, whereby the fibers are brought into modal alignment. It is further preferred that the calculation also include a determination of goodness of fit, whereby it can be assured that the form of each of the functions $L(i)$, $R(i)$ reflects the expected behavior of the transverse intensity function for a clean fiber. Fibers that are not completely cleaned or have various other forms of physical damage exhibit aberrant functions that give rise to poor goodness of fit. Upon detection of such a poor fit, the operator is preferably alerted to examine the fiber for evidence of damage. If found, a damaged or poorly prepared section of the fiber may be removed and the splice re-attempted. The calculation of the goodness-of-fit and cross-correlation functions may be carried out under the control of software operably resident in any general purpose computer, microcomputer, or specialized microprocessor having the requisite amount of storage and computing power and in communication with the present system. Preferably, the present system incorporates microprocessor circuitry for accomplishing these tasks and for controlling the fiber positioning system in accordance with the results of the aforementioned calculations.

The system provides means for effecting high quality, low insertion loss fiber optic splices, for which active optical techniques are essential for attaining sufficiently precise alignment of the fibers in preparation for fusion splicing. The markedly improved functionality and accuracy afforded by the splicer of the invention is absent from existing systems which cannot perform high quality, low loss splices in the environmental and operational conditions for which the present system is especially adapted.

Having thus described the invention in rather full detail, it will be understood that such detail need not be strictly adhered to but that various changes and modifications may suggest themselves to one skilled in the art, all falling within the scope of the present invention as defined by the subjoined claims.

What is claimed is:

1. A splicer system for joining a first optical fiber and a second optical fiber along a common fiber axis by fusion splicing, each of said fibers being polarization-maintaining and having a discrete length and observable, internal asymmetric stress, the system comprising:
   a) a user interface having an output display and user input controls for activating the splicing system;
   b) an electric arc welding system;
   c) holding means for rotatably holding each of said first and second optical fibers, said holding means including first and second fiber holders, each supporting said fiber for rotation in an opening having the shape of an isosceles triangle and substantially circumscribing said fiber;
   d) illumination means for projecting polarized light transversely through said first and second optical fibers;
   e) polarized light detection means for receiving the light passed transversely through said fibers and producing therefrom an electrically detected signal;
   f) rotation means for rotating each of said first and second optical fibers about said common fiber axis;
   g) measuring means for creating first and second transverse intensity functions from variations in said electrically detected signal as said first and second optical fibers are rotated;
   h) lateral alignment means for laterally aligning a first end surface of said first optical fiber with a second end surface of said second optical fiber, whereby said first and second optical fibers are moved in three non-coincident directions to bring into coaxial, abutting relationship said first end surface and said second end surface to form a boundary therebetween;
   i) an imaging optical system having a fiber imaging illuminator and a fiber image detector, said imaging optical system being adapted to acquire optical images of said fibers in a first imaging direction and a second imaging direction, said imaging directions being non-coincident; and
   j) electronic control circuitry having:
      (i) rotation analysis means in communication with said polarized light detection means for receiving said electrically detected signal to: create first and second transverse intensity functions from variations in said electrically detected signal as said first and second optical fibers are rotated; calculate a cross correlation of said first and second transverse intensity functions; a goodness of fit of each of said first and second transverse intensity functions, whereby the condition of said first and second fibers is determined; and a first rotation correction for said first fiber and a second rotation correction for said second fiber optimal aligned position;
      (ii) rotation control means in communication with said rotation means and said rotation analysis means, said rotation control means commanding said rotation means to rotate said first fiber by said first rotation correction and said second fiber by said second rotation correction, whereby said fibers are brought into azimuthal alignment;
      (iii) imaging electronics that receive the output of said fiber image detector and produce a display signal feeding said output display; and
      (iv) fusion control electronics operably connected to activate said electric arc welding system and supply high voltage thereto.

2. A system as recited by claim 1, wherein said first and second imaging directions are substantially mutually orthogonal.

3. A system as recited by claim 1, wherein each of said imaging directions is substantially orthogonal to said common fiber axis.

4. A system as recited by claim 1, wherein said fiber image detector comprises a single imaging device.

5. A system as recited by claim 1, wherein said fiber image detector comprises a charge-coupled device.

6. A system as recited by claim 1, wherein said electronic control circuitry further comprises a profile alignment system in communication with said fiber image detector and said lateral alignment means, and said profile alignment system is adapted to automatically command said lateral alignment means to bring said fibers into alignment prior to said fusion.

7. A system as recited by claim 1, wherein:
   a) said fusion splicing head further comprises a low profile local injection and detection system including:
      (i) a light injector adapted to inject light into said first fiber;
      (ii) and a light detector detecting light in said second fiber; and
      (iii) wherein said local injection and detection system provides an electronic intensity signal indicative of the fraction of said injected light propagated across the interface between said fibers;
   b) said electronic control circuitry further comprises:
      (i) a driver energizing said light injector and measurement electronics connected to said light detector receiving and processing said electronic intensity signal to provide a measured intensity signal;
      (ii) a servo system operative to drive said motion means to maximize said measured intensity signal, whereby the relative position of said fibers is optimized prior to fusion thereof.

8. A system as recited by claim 1, further comprising writeable data storage means adapted to store and transfer data associated with the operation of said splicing system.

9. A system as recited by claim 1, wherein said user input controls comprise control buttons.

10. A system as recited by claim 1, wherein said user input controls comprise a touch screen.

11. A method for joining a first optical fiber and a second optical fiber along a common fiber axis, said fibers maintaining polarization, and the method comprises:
   a) providing a fusion splicing system, the system comprising:
      (i) a user interface having an output display and user input controls for activating the splicing system;
      (ii) an electric arc welding system;
      (iii) holding means for rotatably holding each of said first and second optical fibers, said holding means including first and second fiber holders, each supporting said fiber for rotation in an opening having the shape of an isosceles triangle and substantially circumscribing said fiber;
      (iv) illumination means for projecting polarized light transversely through said first and second optical fibers;
      (v) polarized light detection means for receiving the light passed transversely through said fibers and producing therefrom an electrically detected signal;

(vi) rotation means for rotating each of said first and second optical fibers about said common fiber axis;

(vii) measuring means for creating first and second transverse intensity functions from variations in said electrically detected signal as said first and second optical fibers are rotated;

(viii) lateral alignment means for laterally aligning a first end surface of said first optical fiber with a second end surface of said second optical fiber, whereby said first and second optical fibers are moved in three non-coincident directions to bring into coaxial, abutting relationship said first end surface and said second end surface to form a boundary therebetween;

(ix) an imaging optical system having a fiber imaging illuminator and a fiber image detector, said imaging optical system being adapted to acquire optical images of said fibers in a first imaging direction and a second imaging direction, said imaging directions being non-coincident; and (x) electronic control circuitry having: rotation analysis means in communication with said polarized light detection means for receiving said electrically detected signal to: create first and second transverse intensity functions from variations in said electrically detected signal as said first and second optical fibers are rotated; calculate a cross correlation of said first and second transverse intensity functions; a goodness of fit of each of said first and second transverse intensity functions, whereby the condition of said first and second fibers is determined; and a first rotation correction for said first fiber and a second rotation correction for said second fiber optimal aligned position; rotation control means in communication with said rotation means and said rotation analysis means, said rotation control means commanding said rotation means to rotate said first fiber by said first rotation correction and said second fiber by said second rotation correction, whereby said fibers are brought into azimuthal alignment; imaging electronics that receive the output of said fiber image detector and produce a display signal feeding said output display; and fusion control electronics operably connected to activate said electric arc welding system and supply high voltage thereto;

b) preparing said first and second optical fibers by removing coatings present thereon and cleaving the ends of the fibers to form a mating end on each fiber;

c) mounting said first and second optical fibers in said holding means;

d) laterally aligning said first and second optical fibers in coaxial, abutting relationship;

e) rotating said first fiber to create a first transverse intensity function and said second fiber to create a second transverse intensity function, each of said functions being created from variations in said electrically detected signal;

f) calculating a cross-correlation function of said first and second transverse intensity functions, a maximum of said cross-correlation function a goodness of fit of each of said first and second transverse intensity functions, and a first rotation correction for said first fiber and a second rotation correction for said second fiber, said rotation corrections together corresponding to said maximum;

g) rotating said first fiber by said first rotation correction and said second fiber by said second rotation correction to bring said fibers into azimuthal alignment; and h) fusing said fibers by electric arc welding.

* * * * *